United States Patent [19]

Inoue et al.

[11] Patent Number: 4,814,239

[45] Date of Patent: Mar. 21, 1989

[54] VERTICAL MAGNETIC RECORDING MEDIUM AND METHOD OF MANUFACTURING THE SAME

[75] Inventors: Kazuo Inoue; Motozo Yoshikiyo; Shizuka Yoshii; Iwao Okamoto, all of Yamaguchi, Japan

[73] Assignee: Ube Industries, Ltd., Ube, Japan

[21] Appl. No.: 173,247

[22] Filed: Mar. 24, 1988

[30] Foreign Application Priority Data

Mar. 24, 1987 [JP] Japan .................................. 62-68102
Aug. 25, 1987 [JP] Japan ................................. 62-209140

[51] Int. Cl.$^4$ ................................................ G11B 5/64
[52] U.S. Cl. ..................................... 428/694; 427/42; 427/53.1; 427/131; 427/132; 428/611; 428/678; 428/615; 428/900
[58] Field of Search ............... 438/694, 900, 611, 615, 438/678, 928; 427/42, 53.1, 131, 132

[56] References Cited

U.S. PATENT DOCUMENTS 4,522,844  6/1985  Khanna et al. ...................... 427/38
4,740,386  4/1988  Cheung ............................. 427/53.1

FOREIGN PATENT DOCUMENTS 58-85932  5/1983  Japan .
60-83218  5/1985  Japan .
61-22406  5/1986  Japan .

Primary Examiner—Paul J. Thibodeau
Attorney, Agent, or Firm—Kane, Dalsimer, Sullivan, Kurcz, Levy, Eisele and Richard

[57] ABSTRACT

A vertical magnetic recording medium excellent in durability and recording property in which a first magnetic film comprising Co—Cr or Co—Cr—W as the main ingredient is formed on a substrate and the second magnetic film comprising Co—Cr—W—C as the main ingredient is formed on the first magnetic film, as well as the production process therefor are provided.

8 Claims, 3 Drawing Sheets

VERTICAL MAGNETIC RECORDING MEDIUM AND METHOD OF MANUFACTURING THE SAME

BACKGROUND OF THE INVENTION

This invention concerns a vertical magnetic recording medium having a laminated structure of a first magnetic film comprising Co—Cr or Co—Cr—W as the main ingredient and a second magnetic film comprising Co—Cr—W—C as the main ingredient, excellent in the vertical magnetic property, and also in the durability, as well as a method of manufacturing the same.

As the magnetic recording system using magnetic tapes, floppy discs, hard discs, etc. a method of longitudinal (in plane) magnetization has generally been employed at present. However, with the increasing requirement for high density recording in recent years, a vertical magnetization system has been considered as a substitute for the conventional system. As the medium for the vertical magnetic recording, those having magnetic films comprising Co—Cr series alloy as the main ingredient have been known.

However, in the case of using a Co—Cr series alloy layer as the recording layer, since it has great frictional resistance with a magnetic head, it is liable to undergo abrasion or injury lacks in durability or lubricancy thus bringing about most important problem for practical use. Further, the Co—Cr film also involves a problem in view of the corrosion resistivity and a film capable of withstanding the use or preservation for a long period of time in high temperature and high humidity circumstance has not yet been obtained. Further, a vertical magnetic recording medium having a Co—Cr—W magnetic film as a sort of Co—Cr series magnetic films has also been known (refer to Japanese Patent Laid-Open Nos. Sho 59-65417, Sho 59-129934 and Sho 57-73913), but such a film also involves the similar problems.

For overcoming such drawbacks, it has been considered to dispose a protection film at the surface of the magnetic film. However, although abrasion resistant material (SiO$_2$, etc.) or lubricating material (BN, etc.) has been studied for as such protection film, those capable of satisfying the practical demands such as film thickness, excellent abrasion resistance and lubricancy, as well as excellent bondability with the magnetic film have not yet been obtained. Particularly, in the high density recording using the vertical magetic recording, since it is necessary to shorten the distance between the magnetic head and the magnetic film as small as possible, the protection film is restricted to an extremely thin thickness and it has to be excellent in the abrasion resistance.

In order to overcome such problems, it is necessary that the magnetic layer itself has excellent abrasion resistance.

Then, Co—Cr—W—C alloy film has been found as an alloy film excellent in the abrasion resistance and corrosion resistance and it has been confirmed to be prosperous as the vertical magnetic recording film. However, although the Co—Cr—W—C alloy film is extremely excellent in the abrasion resistance and the corrosion resistance, as well as excellent in the vertical magnetic property, it involves problems that the saturation magnetization is somewhat lower as compared with the Co—Cr thin film and the coercive force is somewhat smaller.

SUMMARY OF THE INVENTION

The present invention has been accomplished in view of the foregoing situations and it is an object thereof to provide a recording medium excellent in durability such as abrasion resistance and corrosion resistance, as well as excellent in the vertical magnetic property.

Another object of the present invention is to provide an advantageous method for producing the vertical magnetic recording medium described above.

A further object of the present invention is to provide a method of forming a vertical magnetization film excellent in the abrasion resistance and the corrosion resistance rapidly and easily.

A still further object of the present invention is to provide a process capable of producing a thin alloy film for use in vertical magnetic recording excellent in the abrasion resistance and the corrosion resistance easily and at a high film forming speed, by using a vacuum vapor deposition process with the improvement for the heating system of an evaporation source composed of a Co—Cr—W—C alloy.

The present invention provides a vertical magnetic recording medium comprising a first magnetic film comprising Co—Cr as the main ingredient formed on a substrate and a second magnetic film comprising Co—Cr—W—C as the main ingredient formed on the first magnetic film.

The present invention further provides a magnetic recording medium comprising a first magnetic film comprising Co—Cr—W as the main ingredient formed on a substrate and a second magnetic film comprising Co—Cr—W—C as the main ingredient formed on the first magnetic layer.

The present ivnention also provides a process for producing vertical magnetic recording medium, which comprises forming a first magnetic layer on a substrate within a film-forming chamber and subsequently introducing gases comprising carbon compound into the film-forming chamber thereby forming the second magnetic film on said first magnetic film.

The present invention also provides a process for producing vertical magnetic recording medium for forming the second magnetic layer by using a vacuum vapor deposition process by using an alloy comprising Co, Cr, W and C as the main ingredient for a evaporation source and heating the evaporation source by the irradiations of laser beams.

DETAILED DESCRIPTION OF THE INVENTION

Figure 1:
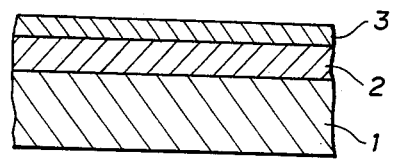
FIG. 1 is a cross sectional view for the portion of a vertical magnetic recording medium according to the present invention.

As shown in FIG. 1, the vertical magnetic recording medium according to the present invention comprises a substrate 1, a first magnetic film 2 and a second magnetic film 3.

The substrate 1 can be formed with a flexible or rigid material. The first magnetic film 2 is present on the upper surface of the substrate 1. In a preferred embodiment, the magnetic film 2 comprises a thin Co—Cr alloy film or a thin Co—Cr—W alloy film. The second magnetic film 3 is a Co—Cr—W—C film to cover the first magnetic film 2 for protecting it against corrosion and abrasion.

The substrate for the vertical magnetic recording medium according to the present invention has no particular restrictuions and organic polymeric materials such as polyimide and polyester or inorganic material such as aluminum or glass plate can be used.

In a case where a magnetic film comprising Co—Cr as the main ingredient is used as the first magnetic film in the present invention, it is preferred that the Co content is from 70 to 90 at% and the Co content is from 10 to 30 at% in the film. Further, in the second magnetic film, it is preferred that the Co content is from 40 to 73.5 at%, the Cr content is from 25 to 35 at%, the W content is from 1 to 10 at% and the C content is from 0.5 to 15 at%.

In the case of using a magnetic film comprising Co—Cr—W as the main ingredient is used as the first magnetic film in the present invention, it is preferred that the Co content is from 50 to 90 at%, the Cr content is from 8 to 25 at% and the W content is from 1.3 to 15 at% in the film. Further, it is preferred that the Co content is from 40 to 73.5 at%, the Cr content is from 25 to 35 at%, the W content is from 1 to 10 at% and the C content is from 0.5 to 15 at% in the second magnetic film.

The thickness of the first magnetic film comprising Co—Cr or Co—Cr—W as the main ingredient is preferably from 100 to 500 and the thickness of the second magnetic film comprising Co—Cr—W—C as the main ingredient is preferably from 10 to 100 nm. The ratio of the thickness for both of the films, that is, (Co—Cr film/Co—Cr—W—C film or Co—Cr—W film/Co—Cr—W—C film) is preferably from 1 to 10.

The first magnetic film comprising of Co—Cr as the main ingredient can be formed by means of a magnetron sputtering method, vacuum vapor deposition using electron beam or laser heating, or ion plating method, and the first magnetic film comprising Co—Cr—W as the main ingredient can also be formed by the same method. In this case, it is preferred to use an alloy substantially of the same composition as that for the desired first magnetic film as a sputtering target or evaporation source.

The second magnetic film comprising Co—Cr—W—C as the main ingredient can also be formed by the same method as that for the first magnetic film. In this case, a gas comprising a carbon-containing compound may be introduced as the C source into a film-forming chamber, decomposing the gas and then reacting with the sputtering substance or evaporation substance.

In the case of forming the magnetic film comprising Co—Cr—W—C as the main ingredient on the first magnetic film comprising Co—Cr or Co—Cr—W as the main ingredient, adhesion between both of the layers is extremely satisfactory. In this case, it is preferred that the second magnetic film is formed succeeding to the formation of the first magnetic film without exposure to the atmosphere in an identical vacuum film-forming chamber.

In the case of forming the second magnetic film by vacuum deposition in the present invention, it is preferred to use an alloy comprising Co, Cr, W and C as the main ingredient for the evaporation source. As the heating source, laser beam, preferably, laser beam capable of obtaining a relatively high power such as $CO_2$ gas or YAG laser may be used. When laser beams at relatively high power are irradiated on the evaporation source, the evaporation source is melted and reaches a high temperature in a short period of time and evaporates briefly. Then, the metal vapors are condensated at the surface of the first magnetic film on the substrate situated at a position opposing to the evaporation source and a thin magnetic film comprising Co, Cr, W and C as the main ingredient is formed there.

Generally, the amount of elements or molecules evaporated from the molten evaporation source is dependent on the evaporation partial pressure for each of the elements and molecules near the evaporation source and it is usually very difficult to render the composition ratio of the respective elements and molecules of the evaporation source equal to that of the vapor deposited films formed by vapor deposition. However, according to the vapor deposition process using the laser heating in the present invention, since the evaporation source is evaporated instantaneously, the composition of the thin alloy formed by this method is the same or identical with that of the evaporation source.

The alloy composition of the evaporation source used in the vacuum deposition is preferably from 40 to 73.5 at% of Co, 25 to 35 at% of Cr, 1 to 10 at% of W and 0.5 to 15 at% of C in view of the properties of the formed thin film.

The present invention will be described more specifically referring to examples and comparative examples.

EXAMPLES 1-5

A magnetron type high frequency dipole sputtering device was used as the sputtering device.

A substrate made of a polyimide film of about 50 μm thickness was used. The film was secured to a support frame made of metal having about 20 cm diameter. After fixing the frame onto the substrate electrode, the inside of a vacuum chamber was evacuated, and the substrate was heated at 350° C. for one hour to apply degasing treatment. After evacuating the inside of the vacuum vessel to $1 \times 10^{-4}$ Pa before sputtering, Ar gas at 99.9995% purity was introduced to the inside of the system and sputtering was conducted under the pressure of 0.5 Pa.

A first maagnetic film comprising Co—Cr was prepared by using an alloy target of Co—Cr (atomic ratio 78:22). Further, a second magnetic alloy film comprising Co—Cr—W—C was prepared by using an alloy target comprising Co—Cr—W—C (atomic ratio, 67:28:2:3). The target used had a size of 6 inch diameter and 5 mm thickness. The film forming conditions are shown in Table 1, while the properties of the films obtained are shown in Table 2.

The magnetic property wasw measured by a vibrating samploe magnetometer (VSM). $\theta_{50}$ was determined by the half value width in the rocking curve of (002) diffraction.

The abrasion resistance to a magnetic head was measured by fabricating the specimen into a floppy disc, which was then set to a floppy disc measuring device and measured by the reduction in the output after it was brought into contact with a ring type dummy head for 200,000 cycles.

COMPARATIVE EXAMPLE 1-4

A vertical magnetic recording medium using only the Co—Cr film or the Co—Cr—W—C film as the magnetic film was prepared by the similar method to that in Examples 1-5 by the sputtering process.

The film-forming conditions are shown in Table 1, while the properties of the resultant films are shown in Table 2.

TABLE 1

| | Co—Cr film | | | Co—Cr—W—C film | | |
|---|---|---|---|---|---|---|
| No. | RF voltage kV | Substrate temperature °C. | Film thickness nm | RF voltage kV | Substrate temperature °C. | Film thickness nm |
| Example | | | | | | |
| 1 | 1.5 | 150 | 270 | 1.5 | 150 | 30 |
| 2 | 3 | 150 | 270 | 3 | 150 | 30 |
| 3 | 3 | 250 | 270 | 3 | 250 | 30 |
| 4 | 3 | 150 | 250 | 3 | 150 | 50 |
| 5 | 8 | 150 | 250 | 3 | 150 | 100 |
| Comparative Example | | | | | | |
| 1 | 3 | 150 | 300 | / | / | / |
| 2 | 3 | 250 | 300 | / | / | / |
| 3 | / | / | / | 3 | 150 | 250 |
| 4 | / | / | / | 3 | 300 | 250 |

TABLE 2

| No | Saturation magnetization emu/cm³ | Vertical coercive force Oe | Δθ₅₀ degree | Output reduction after 200,000 pass dB |
|---|---|---|---|---|
| Example | | | | |
| 1 | 260 | 1500 | 3.2 | 0.9 |
| 2 | 270 | 1500 | 6.5 | 1.0 |
| 3 | 290 | 1400 | 4.0 | 0.8 |
| 4 | 270 | 1300 | 3.8 | 0.9 |
| 5 | 240 | 1200 | 3.0 | 0.9 |
| Comparative Example | | | | |
| 1 | 280 | 1500 | 6.7 | 3.2 |
| 2 | 300 | 1300 | 4.0 | 3.5 |
| 3 | 160 | 500 | 4.3 | 0.8 |
| 4 | 180 | 800 | 2.8 | 0.9 |

EXAMPLE 6-8

A first magnetic film comprising Co—Cr and a second magnetic film comprising /Co—Cr—W—C were prepared by electron beam heating using a vapor deposition device capable of setting two crucibles.

A Co—Cr alloy (atomic ratio 80:20) and a Co—Cr—W—C alloy (atomic ratio 67:28:2:3) were put respectively into the two crucibles made of carbon and used as the vacuum deposition source.

A polyimide film of about 50 μm thickness was used as the substrate in the same manner as in Examples 1-5. After evacuating the inside of the vacuum device to $5 \times 10^{-5}$ Pa, the substrate was heated at 350° C. for 2 hours to apply degasing treatment.

Then, the temperature of the substrate was maintained constant at 200°-300° C., while the crucibles containing the Co—Cr alloy was heated by electron beams to prepare a Co—Cr film on the substrate. The electron beam acceleration voltage was 10 kV. Thus, a magnetic film of about 250 nm film thickness was obtained at the vapor deposition rate of about 5 nm/sec.

Then, while maintaining the temperature of the substrate to at 200°-300° C., the crucible containing the Co—Cr—W—C alloy was heatecd by electron beams to form a Co—Cr—W—C film on the Co—Cr film. The acceleration voltage for the electron beams was 10 kV and the beam current was 200-500 mA.

Thus, a Co—Cr—W—C film of about 50-70 nm thickness was obtained at a vapor deposition rate of about 5 nm/sec.

The film forming conditions are shown in Table 3 and the properties of the resultant films are shown in Table 4.

COMPARATIVE EXAMPLES 5-8

A vertical magnetic recording medium using only the Co—Cr film or the Co—Cr—W—C film as the magnetic film was prepared in the same manner as in Examples 6-8 by the vapor deposition method.

The film-preparing conditions are shown in Table 3, while and the properties of the resultant films are shown in Table 4.

TABLE 3

| | | Co—Cr film | | | | Co—Cr—W—C film | | | |
|---|---|---|---|---|---|---|---|---|---|
| No | | Acceleration voltage kV | Beam current mA | Substrate temp. °C. | Film thickness nm | Acceleration voltage kV | Beam current mA | Substrate temp. °C. | Film thickness nm |
| Example | | | | | | | | | |
| 6 | | 10 | 200 | 200 | 250 | 10 | 200 | 200 | 50 |
| 7 | | 10 | 200 | 300 | 250 | 10 | 200 | 300 | 50 |
| 8 | | 10 | 500 | 200 | 250 | 10 | 500 | 200 | 70 |
| Comparative Example | | | | | | | | | |
| 5 | | 10 | 200 | 200 | 310 | / | / | / | / |
| 6 | | 10 | 500 | 200 | 300 | / | / | / | / |
| 7 | | / | / | / | / | 10 | 200 | 200 | 300 |
| 8 | | / | / | / | / | 10 | 500 | 200 | 310 |

TABLE 4

| No | Saturation magnetization emu/cm³ | Vertical Coercive force Oe | Δθ₅₀ degree | Output reduction after 200,000 pass dB |
|---|---|---|---|---|
| Example | | | | |
| 6 | 300 | 1200 | 4.1 | 1.0 |
| 7 | 270 | 1200 | 4.1 | 1.1 |
| 8 | 290 | 1100 | 4.1 | 0.9 |
| Comparative Example | | | | |
| 5 | 300 | 1100 | 5.4 | 3.3 |
| 6 | 280 | 1200 | 5.1 | 3.5 |
| 7 | 200 | 400 | 4.5 | 0.9 |

TABLE 4-continued

| No | Saturation magnetization emu/cm³ | Vertical Coercive force Oe | Δθ₅₀ degree | Output reduction after 200,000 pass dB |
|---|---|---|---|---|
| 8 | 180 | 600 | 3.6 | 1.0 |

EXAMPLE 9

A vertical magnetic recording medium was prepared in the same procedures as in Examples 1-5 except for preparing the first magnetic film using Co—Cr—W (atomic ratio, 71:21:8) as the alloy target.

The film-forming conditions are shown in Table 5, while the properties of the resultant films are shown in Table 6.

EXAMPLE 10

A vertical magnetic recording medium was prepared in the same procedures as in Example 9 except for preparing the first magnetic film using Co—Cr—W (atomic ratio, 70:19:11) as the alloy target.

The film-forming conditions are shown in Table 5, while the properties of the resultant films are shown in Table 6.

COMPARATIVE EXAMPLES 9, 10

Vertical magnetic recording media having only the Co—Cr—W film or Co—Cr—W—C film as the magnetic film were prepared in the same procedures as in Examples 9, 10.

The film-forming conditions are shown in Table 5, while the properties of the resultant films are shown in Table 6.

TABLE 5

| | Co—Cr—W film | | | Co—Cr—W—C film | | |
|---|---|---|---|---|---|---|
| No | RF voltage kV | Substrate temp. °C. | Film thickness nm | RF voltage kV | Substrate temp. °C. | Film thickness nm |
| Example | | | | | | |
| 9 | 3 | 150 | 270 | 3 | 150 | 30 |
| 10 | 3 | 150 | 270 | 3 | 150 | 30 |
| Comparative Example | | | | | | |
| 9 | 3 | 150 | 300 | / | / | / |
| 10 | 3 | 150 | 300 | / | / | / |

TABLE 6

| No | Saturation magnetization emu cm³ | Vertical coercive force Oe | Δθ₅₀ degree | Output reduction after 200,000 pass dB |
|---|---|---|---|---|
| Example | | | | |
| 9 | 250 | 110 | 3.8 | 0.8 |
| 10 | 230 | 1000 | 3.6 | 0.8 |
| Comparative Example | | | | |
| 9 | 260 | 1000 | 3.8 | 2.6 |
| 10 | 240 | 900 | 3.6 | 2.4 |

As apparent from Tables 1-6, the vertical magnetic recording media according to the present invention are excellent in the magnetic property and the vertical orientation and also excellent in the abrasion resistance.

EXAMPLE 11

Figure 2:
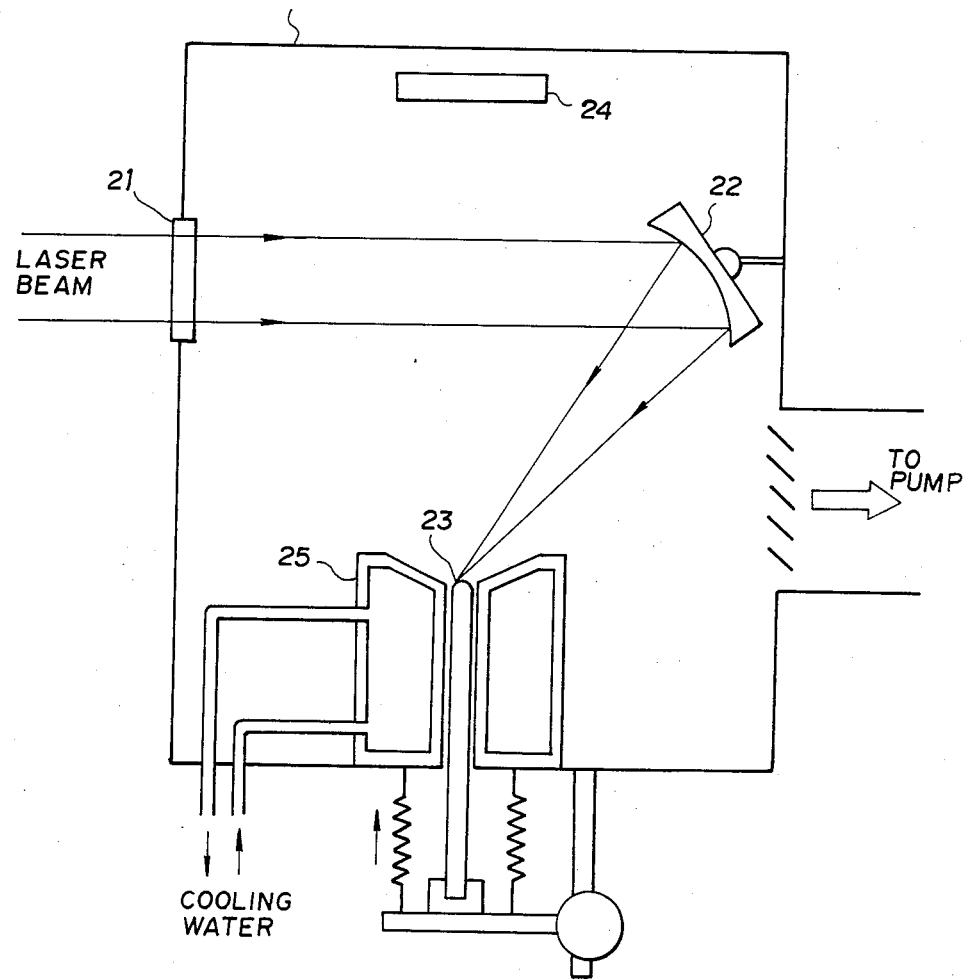
FIG. 2 is a schematic view for the constitution of a vacuum deposition device in one embodiment according to the present ivnention.

FIG. 2 shows a vacuum vapor deposition device comprising a laser beam incident window 21 formed with ZnSe, a concaved mirror 22 made of copper, a rod-like evaporation source 23 comprising Co, Cr, W and C as the main ingredient and a substrate 24 set at a position opposed thereto for forming a vapor deposition film, a water-cooled copper block 25 and a vacuum chamber 26.

Parallel beams of $CO_2$ gas laser entering through the incident window 21 are converged by way of the concaved mirror 22 made of copper directed orthogonally downwardly to the top end of the evaporation source 23 comprising Co, Cr, W and C as the main ingredient and then focused there. Thus, only the top end of the evaporation source 23 is rapidly heated and melted and evaporated as metal vapors. The metal vapores are condensed at the surface of the substrate 24 to form there a thin alloy film comprising Co, Cr, W and C as the main ingredient.

The lower portion of the evaporation source 23 except for the top end is sufficiently water-cooled by means of a copper block of good heat conductivity to prevent the melting of the evaporation source 23. Furthermore, since the top end of the evaporation source 23 is evaporated to consume by the irradiation of the laser beams, a mechanism is employed for pushing out the rod-like evaporation source from below depending on the amount of consumption. The melted portion is defined to an extremely limited region of the evaporation source 23 and the melted metal (molten metal) can be evaporated instantaneously by the energy of the intense laser beam by such mechanism.

Accordingly, it is the feature of the vacuum vapor deposition process that the difference is extremely small between the composition of the evaporation source 23 and that of the vapor deposition film on the substrate 24.

The vapor depositing experiment was conducted as below by using such a device.

A polyimide film of 40 μm thickness was used as the substrate 24. After evacuating the inside of the vacuum vessel 26 to $5 \times 10^{-5}$ Pa, the substrate 25 was heated to 300° C. for 2 hours to remove the water content, solvent and gases adsorbed to the substrate 24. The step is extremely important for obtaining a film excellent in the properties as the vertical magnetic film.

When the evaporating experiment was conducted while maintaining the thus pre-treated substrate 24 at 200° C., by using the evaporation source comprising 65.4 at% Co, 28.3 at% Cr, 1.5 at% W and 4.7 at% C, setting the power of the $CO_2$ gas laser to 1 kW and adjusting the distance between the top end of the evaporation source 23 and the substrate 24 to 500 mm, a magnetic film of 0.8 μm thickness was formed on the substrate 24 and the vapor deposition rate was 3 μm/sec.

Figure 3:
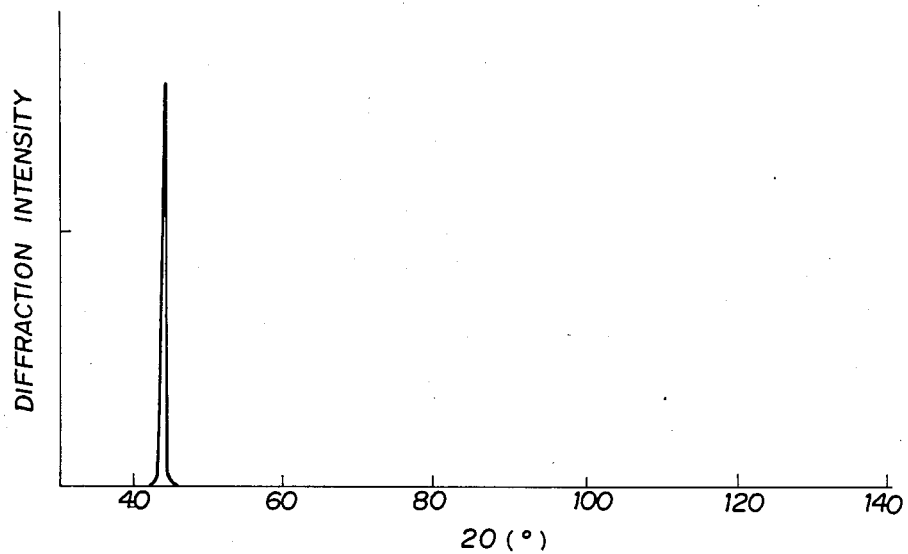
FIG. 3 is a graph showing the X-ray diffractometry in the magnetic film obtained in the example.
Figure 4:
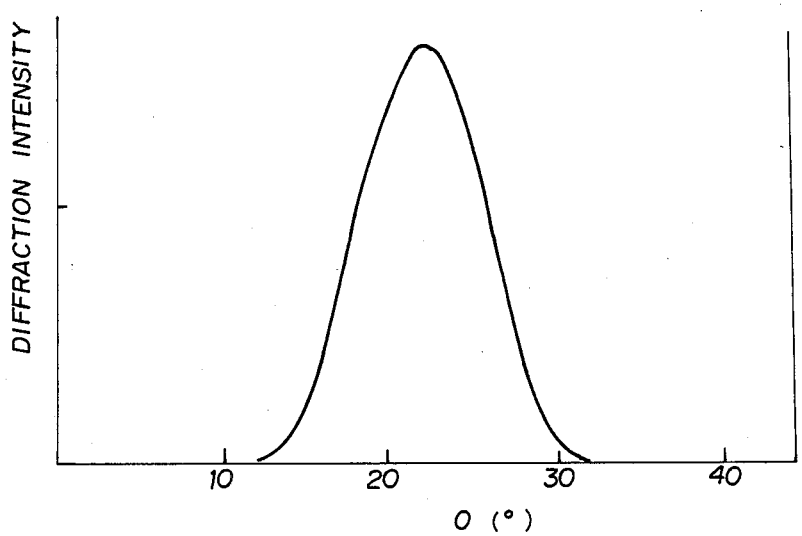
FIG. 4 is a graph illustrating a rocking curve thereof and FIG. 5 is a graph illustrating the magnetic characteristics thereof.

X-ray-diffraction pattern of the resultant magnetic film is shown in FIG. 3. As apparent from the figure, (002) diffraction of Co crystals inherent to the vertical mangetic film clearly appears at $2\theta = 44.4°$. Further, the rocking curve at $2\theta = 44.4°$ is shown in FIG. 4. It can be seen from the figure that the film is excellent in the vertical orientation.

The composition of the obtained magnetic film was analyzed by using I.C.P (inductively coupled plasma analysis) and Auger Electron Spectroscopy and it was confirmed substantially equal with the composition of the alloy used as the evaporation source.

Figure 5:
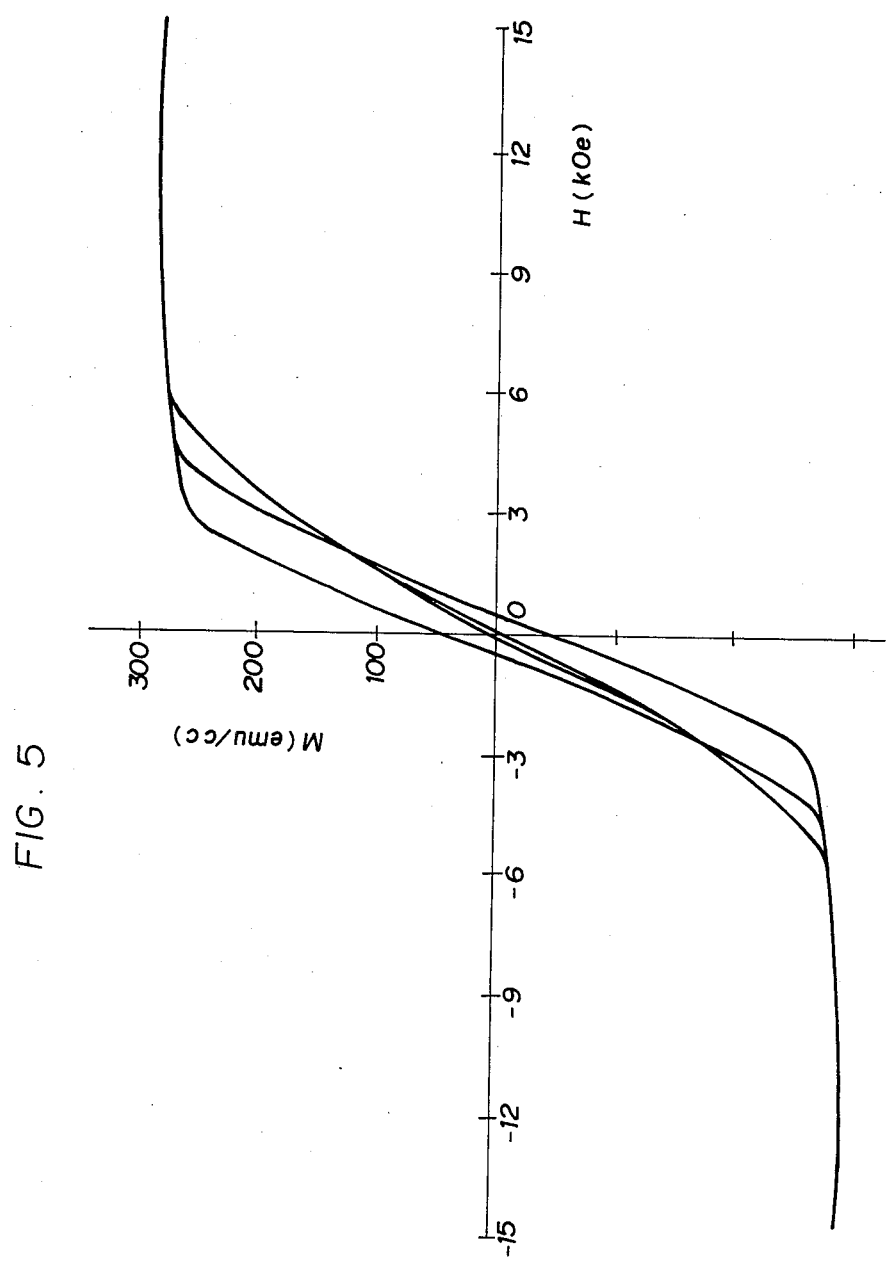

Further, the magnetic property of the magnetic film is as shown in FIG. 5 and it can be seen that the vertical property is excellent.

The magnetic film is excellent in the abrasion resistance and the corrosion resistance in the same manner as the film prepared by the sputtering process and it is comparable with the latter in view of the physical property.

In the present embodiment, although the magnetic film comprising Cr—W—C as the main ingredient is formed direclty onto the substrate, it is also possible to form a magnetic film comprising Co—/Cr as the main ingredient or comprising Co—Cr—W as the main ingredient on the substrate and further form thereover a magnetic film mainly composed of Co—Cr—W—C as the main ingredient, by which the vertical magnetic recording medium according to the present invention can be obtained. In this case, both of the two films can be formed by the vacuum vapor deposition using the laser heating as described above.

As is apparent the foregoings, since an alloy comprising Co, Cr, W and C as the main ingredient is used as the evaporation source for the vacuum vapor deposition process and it is rapidly heated to melt and evaporated by the laser beams according to the present invention, it is possible to form the same or substantially the same composition as that of the evaporation film on the substrate. Accordingly, it is possible to produce a vertical magnetic recording medium excellent in the characteristics such as the abrasion resistance or the corrosion resistance easily and at a high productivity according to the present invention.

What is claimed is:

1. A vertical magnetic recording medium wherein a first magnetic film comprising Co—Cr as the main ingredient is formed on a substrate, and a second magnetic film comprising Co—Cr—W—C as the main ingredient which has the Co content of from 40 to 73.5 at%, the Cr content of from 25 to 35 at%, the W content of from 1 to 10 at% and the C content of from 0.5 to 15 at%, is formed on said first magnetic film.

2. A vertical magnetic recording medium as defined in claim 1, wherein the first magnetic film has the Co content of from 70 to 90 at% and the Cr content of from 10 to 30 at%.

3. A process for producing a vertical magnetic recording medium as defined in claim 1, wherein the second magnetic film is formed by using a vacuum vapor deposition process, in which an alloy having the Co content of from 40 to 75 at%, the Cr content of from 25 to 35 at%, the W content of from 1 to 10 at% and the C content of from 0.5 to 15 at% is used as an evaporation source and the evaporation source is heated by the irradiation of laser beams.

4. A process for producing a vertical magnetic recording medium as defined in claim 2, wherein the second magnetic film is formed by using a vacuum vapor deposition process, in which an alloy having the Co content of from 40 to 73.5 at%, the Cr content of from 25 to 35 at%, the W content of from 1 to 10 at% and the C content of from 0.5 to 15 at% is used as an evaporation source and the evaporation source is heated by the irradiation of laser beams.

5. A vertical magnetic recording medium, wherein a first magnetic film comprising Co—Cr—W as the main ingredient is formed on a substrate, and a second magnetic film comprising Co—Cr—W—C as the main ingredient which has the Co content of from 40 to 73.5 at%, the Cr content of from 25 to 35 at%, the W content of from 1 to 10 at% and the C content of from 0.5 to 15 at%, is formed on said first magnetic film.

6. A vertical magnetic recording medium as defined in claim 5, wherein the first magnetic film has the Co dcontent of from 50 to 90 at%, the Cr content of from 8 to 25 at% and the W content of from 1.3 to 15 at%.

7. A process for producing a vertical magnetic recording medium as defined in claim 5, wherein the second magnetic film is formed by using a vacuum vapor deposition process, in which an alloy having the Co content of from 40 to 73.5 at%, the Cr content of from 25 to 35 at%, the W content of from 1 to 10 at% and the C content of from 0.5 to 15 at% is used as an evaporation source and the evaporation source is heated by the irradiation of laser beams.

8. A process for producing a vertical magnetic recording medium as defined in claim 6, wherein the second magnetic film is formed by using a vacuum vapor deposition process, in which an alloy having the Co content of from 40 to 73.5 at%, the Cr content of from 25 to 35 at%, the W content of from 1 to 10 at% and the C content of from 0.5 to 15 at% is used as an evaporation source and the evaporation source is heated by the irradiation of laser beams.

* * * * *